Figure 3:
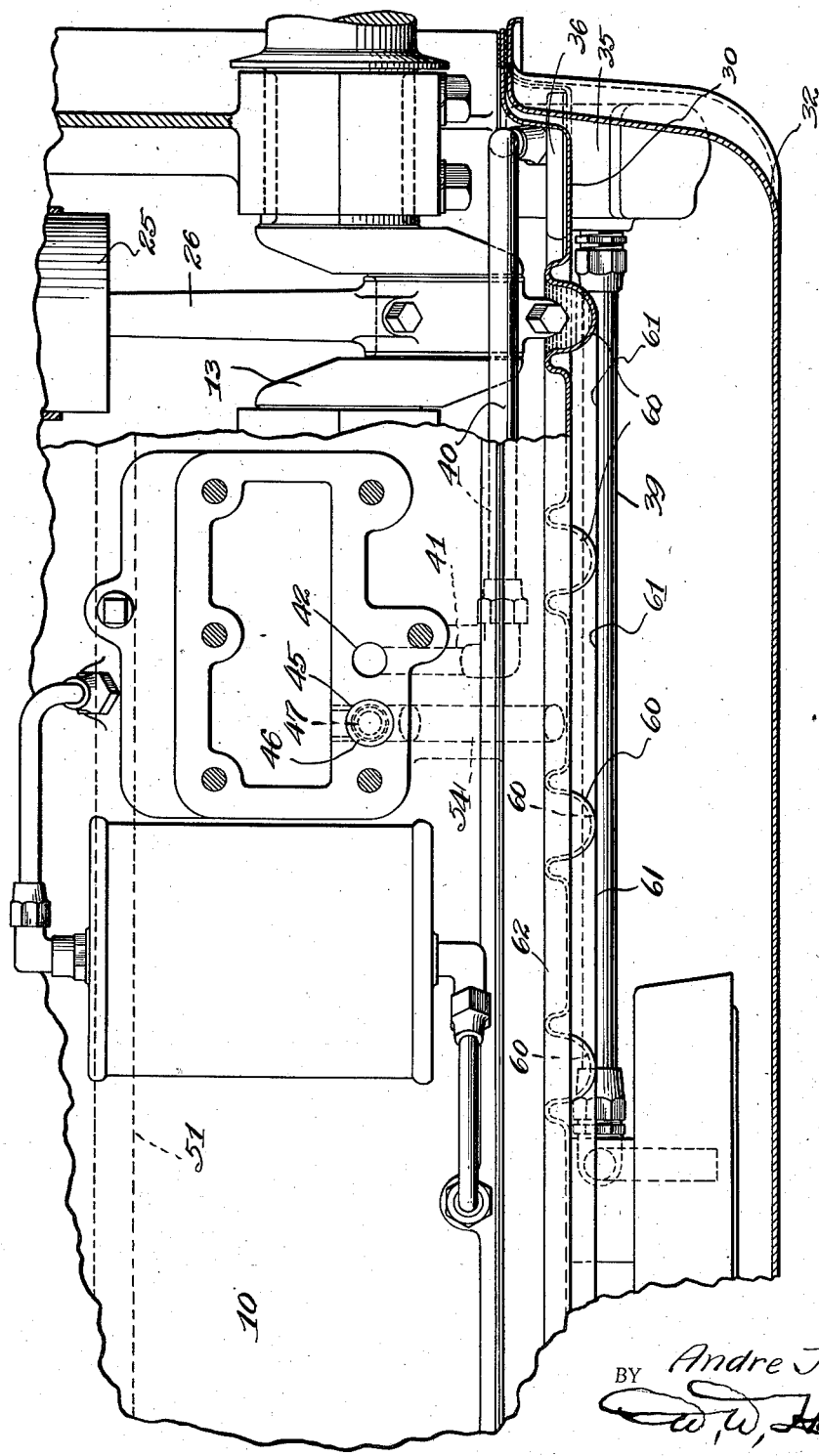

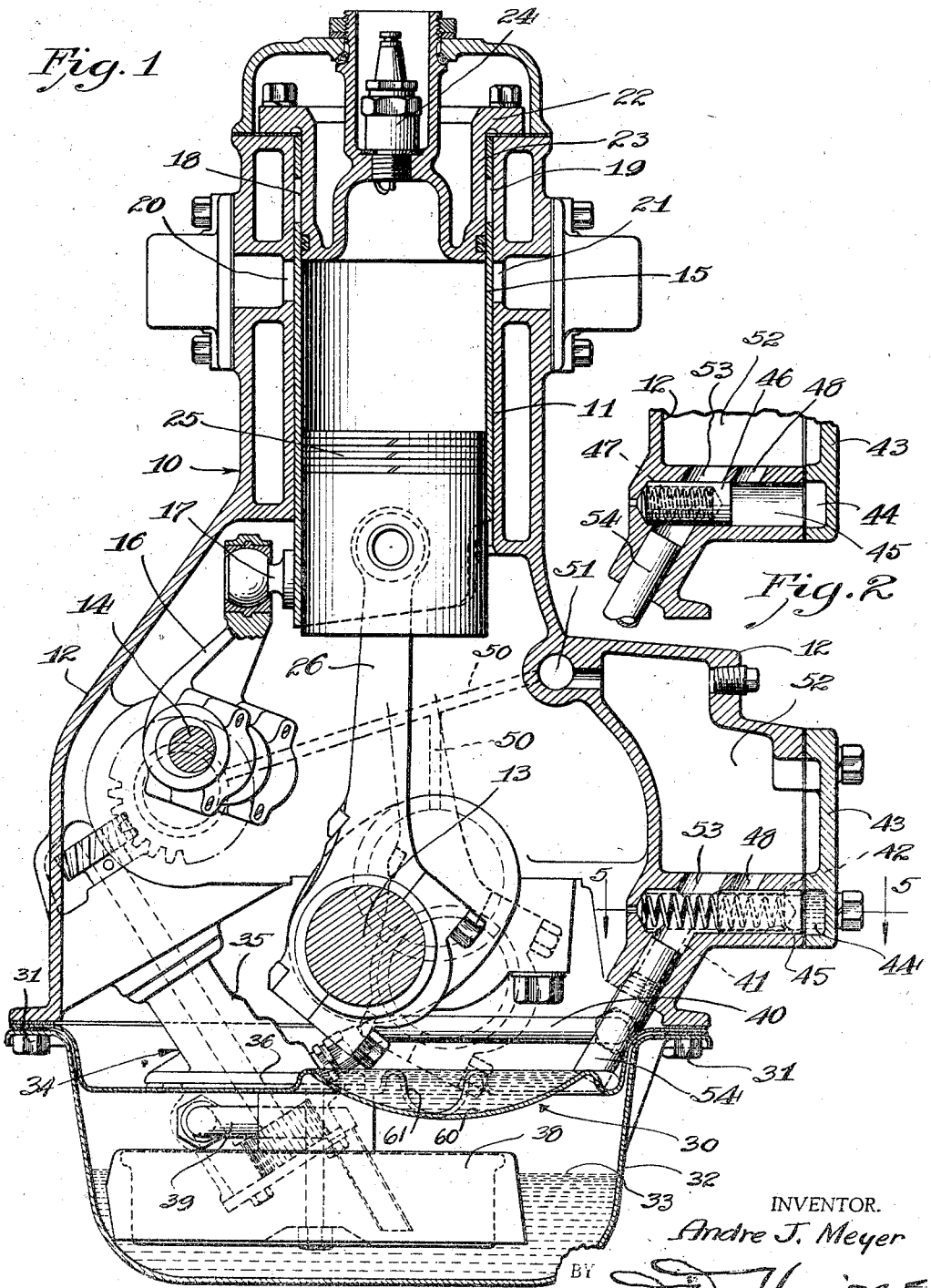

Sept. 21, 1937.    A. J. MEYER    2,093,570
ENGINE
Filed June 1, 1931    3 Sheets—Sheet 2

INVENTOR.
BY Andre J. Meyer.
ATTORNEY.

Sept. 21, 1937.  A. J. MEYER  2,093,570
ENGINE
Filed June 1, 1931  3 Sheets-Sheet 3

INVENTOR.
Andre J. Meyer
BY
ATTORNEY.

Patented Sept. 21, 1937

2,093,570

UNITED STATES PATENT OFFICE 2,093,570

ENGINE

Andre J. Meyer, Detroit, Mich., assignor to Continental Motors Corporation, Detroit, Mich., a corporation of Virginia Application June 1, 1931, Serial No. 541,197

11 Claims. (Cl. 184—6)

My invention relates to engines and more particularly to an engine lubricating system especially adapted for employment with an engine of the sleeve valve type having a plurality of reciprocating elements preferably requiring initial lubrication on starting the engine.

My invention shown in the illustrated embodiment of the invention may be incorporated in engines other than those of the sleeve valve type if so desired and the various features shown and described in the accompanying specification and drawings may be successfully used in connection with engines of the poppet valve type or engines having other types of valves as well as with engines of the single sleeve valve type herein illustrated. Such a construction as I have herein described and shown is especially adapted for use with an engine of the Burt-McCollum type employing a single sleeve valve means which is given a combined reciprocating and oscillating movement in a well known manner so that any point on the sleeve traverses a closed path.

An object of my present invention is to facilitate the lubrication of moving engine elements during the initial engine operation by providing a splash lubricating system in connection therewith which functions during the initial engine operation.

Another object of my invention is to provide a novel splash lubrication system for an internal combustion engine having a plurality of engine elements requiring lubrication during the initial operation of the engine by providing a splash lubricating device constructed for operation during the initial engine operation.

A further object of my invention is to provide a novel splash lubricating device for an internal combustion engine adapted for operation during the initial operating period of the engine by providing a novel control mechanism associated therewith.

A still further object of my invention is to provide an improved lubricating system for an internal combustion engine including an engine casting having lubricant conducting passages for conveying lubricant to engine parts to be lubricated by providing an automatically actuated valve mechanism intermediate the passages and a source of lubricant supply and auxiliary splash pan in which a supply of lubricant is adapted to be deposited during inoperative periods of the engine to provide a source of lubricant supply adapted to be splashed on engine elements requiring lubrication during the initial operation of the engine.

Figure 4:
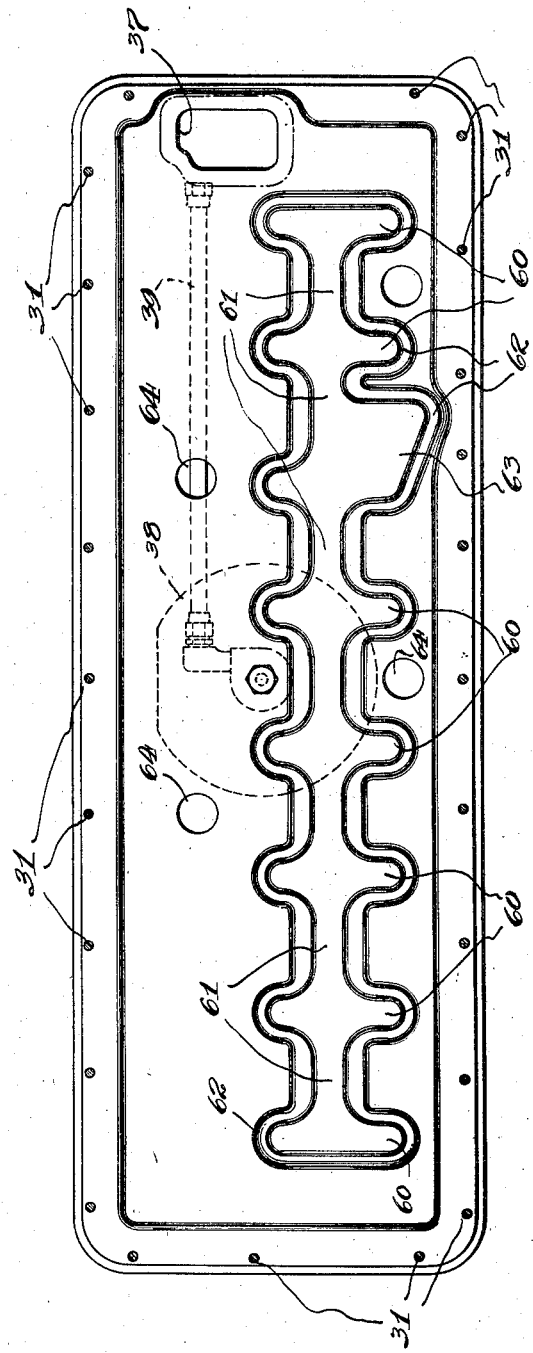
Figure 5:
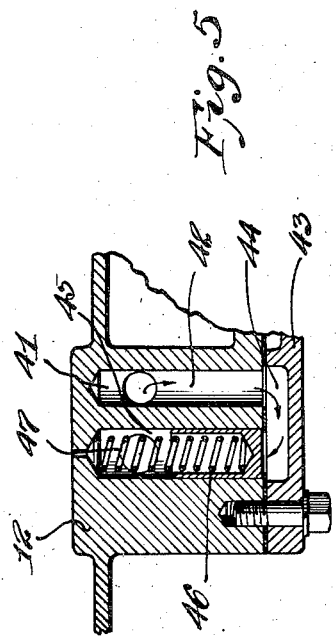

For a more detailed understanding of my invention, reference may be had to the accompanying drawings which illustrate one form which my invention may assume, and in which:

Figure 1 is a transverse sectional view through an internal combustion engine of the sleeve valve type illustrating my invention associated therewith, Figure 2 is a fragmentary detailed sectional view of the valve mechanism in the position assumed when the engine is in operation, Figure 3 is a side elevational view of a portion of the engine constructed in accordance with my invention and showing parts of the engine structure broken away for the purpose of more clearly illustrating certain details and features of my invention, Figure 4 is a plan view of the splash pan as shown in Figures 1 and 3, and Figure 5 is a detail sectional view of the valve mechanism taken substantially on the line 5—5 of Figure 1.

I have chosen for purposes of illustration to show my invention incorporated with an engine of the sleeve valve type and more particularly an engine employing sleeve valves of the Burt-McCollum type which are operated in the usual manner.

In general the engine shown in the accompanying illustration embodies an engine casting forming engine cylinders 11 and a crankcase structure 12 which is adapted to support in the usual way a crankshaft 13 and a valveshaft 14. Sleeve valve means 15 operate within the cylinder 11 and may be connected with the valveshaft in any suitable manner and in the illustrated embodiment of my invention the valveshaft 14 consists of a wobble shaft which is connected with said sleeve valve means by the arms 16 which are adapted to swivelly connect with the sleeve driving lugs carried by the sleeve valve means 15. This sleeve valve means is provided with intake and exhaust ports 18 and 19 respectively, said sleeve valve means being actuated in the usual manner to cause said sleeve intake and exhaust ports to cooperate with the cylinder intake and exhaust ports 20 and 21 respectively. Preferably a cylinder head 22 is secured to the engine casting by any suitable securing means and is provided with a portion 23 depending within the cylinder and spaced therefrom to provide a suitable sleeve pocket for receiving the upper end of the sleeve valve means. The cylinder head and engine casting are suitably jacketed to provide jackets through which a cooling medium may be circulated and the cylinder head may be provided with the usual type of spark plug 24. A piston 25 operates within the sleeve valve means and is connected with the crankshaft by means of a connecting rod 26.

In a sleeve valve engine it is quite necessary to lubricate both the inside and outside surfaces of the sleeve valve means to insure proper engine performance. I find that it is most desirable to lubricate these surfaces during the initial operation of the engine by a splash lubricating system, but I have also found that after the engine is once started in operation the necessity of said splash lubricating is less important and in fact I find it desirable to cut out the splash lubricating system when the engine is in operation. In sleeve valve engines and especially when said engines are operated in cold weather it is found that the sleeve and pistons are more efficiently moved and operated if the adjacent bearing surfaces are lubricated during the initial engine operation until such time as sufficient oil or lubricant is supplied thereto through the usual channels.

In order to carry out the principles of my invention I have provided a splash pan 30 secured to the underside of the crankcase structure 12 by means of bolts or other fastening devices 31, these bolts also serving to secure the usual oil pan 32 to the crankcase structure 12, said oil pan being adapted to store a quantity of lubricant 33. The principles of my invention may be best carried out by depositing a predetermined quantity of lubricant in the splash pan which may be splashed on to the engine elements requiring lubrication during the initial operation of the engine. The lubricant is deposited in this splash pan through the agency of the mechanism hereinafter described. A pump 34 is supported by the crankcase and by the splash pan 30 and is operatively connected preferably with the valve shaft 14. The pump is provided with a casing 35 having a flange 36 which is adapted to rest on the upper face of the splash pan 30. The pump projects through a hole or opening 37 in the splash pan and the intake of said pump is connected to a filter device 38 by means of a conduit or pipe 39. Preferably the filter device 38 is located substantially adjacent the middle of the engine and lubricant is sucked from the oil pan 32 and forced into the conduit or pipe 40 connected with the outlet of the pump. This conduit or pipe 40 is constructed for operative connection with a passage 41 in the crankcase structure said passage 41 communicating preferably with a horizontally extending passage 42 opening through the outer face of the crankcase structure as shown in Figure 5. A cover 43 is secured to the crankcase structure and is provided with a cored out passage 44 constructed in open communication with the passage 42. I have provided another passage 45 which is preferably arranged alongside the passage 42 and adapted to slidably support a plunger valve 46, said valve being urged outwardly by means of the spring 47 and constructed to close the passage 48 which communicates with the passage 45. When the engine is started the pump immediately builds up pressure in the conduit 40, passages 41, 42 and 44, this pressure being applied to the yieldingly supported plunger or piston 46 and causing the same to move into a position as shown in Figure 2 which uncovers the passage 48 and places this passage 48 in open communication with the pressure side of the pump. The passage 48 communicates with the lubricating system of the engine and preferably with passages 50 constructed in the crankcase structure 12. These passages 50 are preferably connected with the passage 51 which serves as an oil header this header in the present embodiment being constructed in open communication with a reservoir 52 said passage 48 being at all times in open communication with the said reservoir. The cover 43 closes the open portion of the reservoir.

Thus the valve structure above described is actuated in response to lubricant pressure induced by the pump to place the lubricant conducting passages in the crankcase structure 12 in communication with the pressure side of said pump. The reservoir 52 is provided with an outlet 53, this outlet being preferably connected with a pipe or conduit 54 arranged to communicate with the splash pan 30. When the valve plunger 46 is advanced under pressure induced by the pump to place the reservoir in open communication with the passage 45, it will be noted that the plunger valve is constructed of such length as to close the outlet 53. During the operation of the engine the valve means is positioned substantially as illustrated in Figure 2 but on stopping the engine the lubricant pressure within the passages 50 and the reservoir 52 falls permitting the spring 47 to return the plunger valve to the position shown in Figure 1 thereby opening the outlet 53 and permitting the lubricant contained within the reservoir to be dumped into the splash pan 30.

This splash pan 30 is provided with a plurality of depressions 60 extending generally transverse of the engine axis and constructed to lie adjacent to the connecting rods 26. It will be noted that in the engine illustrated I have shown eight of these depressions for association with eight separate connecting rods employed with an engine of the eight cylinder type. These depressions 60 are connected by channel portions 61 extending longitudinally of the engine and said depressions and channels are of substantially the same depth and surrounded by a continuous upwardly extending beaded portion 62. The lubricant is adapted to be dumped from the reservoir in the enlarged depression 63 of the splash pan and to thence flow into all of the depressions 60 and the interconnecting channels 61. Any of the lubricant which overflows the beaded portion 62 is drained from the floor of the splash pan through the openings 64 into the oil pan 32.

The lubricant held or stored within the depressions carried by the splash pan is adapted to be splashed onto various engine elements requiring lubrication by the connecting rods 26 during the initial operation of the engine. After the engine has turned over a few times the lubricant within the splash pan is substantially used up and no more lubricant is splashed on to these engine elements. The initial operating period of the engine is the critical time and this splash lubricating device shown and described herein is adapted to provide adequate lubrication during the initial operation of the engine. Immediately on starting the engine the outlet 53 from the reservoir 52 is closed by the valve 46 and lubricant is forced into the oil header 51 and passages 50 in the usual manner. Experience has shown that it is only a matter of about half a minute before the reservoir and header are completely filled with lubricant and the engine bearings and other parts to be lubricated are thus supplied with lubricant through the passages 50 within a very short time after starting the engine. When the engine again stops the outlet 53 is open and the supply of lubricant in the splash pan is replenished so that when the engine is again started the various engine parts to be lubricated by this splash system may be properly lubricated in a manner as previously described.

It will be observed that the mechanism shown and described in the accompanying drawings and specification may be economically constructed and readily associated with an engine structure. The device as described contains a minimum of moving elements and is so operated as to insure adequate lubrication of the engine elements requiring lubrication at all times. The valve mechanism controlling the lubricant distribution is actuated in response to lubricant pressure and thus is automatically actuated and requires no adjustment or attention on the part of the operator. Such a device may be readily serviced with a minimum amount of cost since the moving parts of said valve mechanism are readily accessible on removing the cover 43.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. A lubricating system for an internal combustion engine and including a crankcase adapted for storing a supply of lubricant, a splash pan supported therein, a lubricant reservoir having an outlet communicating with said splash pan and communicating with the engine parts to be lubricated, means feeding lubricant to said reservoir under pressure, and valve means associated with the reservoir outlet and actuated in response to a fall of pressure in said reservoir whereby to permit the contents of said reservoir to drain into said splash pan when the engine stops.

2. In a lubricating system for an internal combustion engine consisting of means for conducting a lubricant under pressure to engine parts to be lubricated, splash lubricating means adapted for operation during the initial engine operation, and means responsive to the engine operation for selectively distributing lubricant to the lubricant conducting means during engine operation and to said splash lubricating means on stopping the engine.

3. In a lubricating system for an internal combustion engine consisting of means for conducting a lubricant under pressure to engine parts to be lubricated, splash lubricating means adapted for operation during the initial engine operation, and valve means automatically responsive to lubricant pressure for selectively distributing lubricant to the lubricant conducting means during engine operation and said splash lubricating means on stopping the engine.

4. A lubricating system for an internal combustion engine and including a crankcase adapted for storing a supply of lubricant, a splash pan, means circulating lubricant through said lubricating system under pressure, and including a pump, valve means intermediate said pump and system actuated in response to a rise in pressure on the pressure side of said pump to place said system in communication with the pump, said system having an outlet in communication with said splash pan, and said valve means actuated in response to a predetermined pressure fall in said lubricating system to drain a portion of said lubricant into said splash pan.

5. A lubricating system for an internal combustion engine and including a crankcase adapted for storing a supply of lubricant, a splash pan, means circulating lubricant through said lubricating system under pressure, and including a pump, valve means intermediate said pump and system actuated in response to a rise in pressure on the pressure side of said pump to place said system in communication with the pump, said system having an outlet in communication with said splash pan, said valve means arranged to close said outlet while said engine is in operation and to open same on stopping said engine to drain a predetermined quantity of lubricant in said splash pan.

6. A lubricating system for an internal combustion engine and including a crankcase adapted for storing a supply of lubricant, a splash pan, means circulating lubricant through said lubricating system under pressure, and including a pump, said system having an inlet and outlet communicating respectively with the pump and splash pan, and common valve means for said inlet and outlet actuated in response to pressure within said lubricating system.

7. A lubricating system for an internal combustion engine and including a crankcase adapted for storing a supply of lubricant, a splash pan, means circulating lubricant through said lubricating system under pressure, and including a pump, said system having an inlet and outlet communicating respectively with the pump and splash pan, and valve means for said inlet and outlet actuated in response to pressure within said lubricating system, to drain a portion of said lubricant into the splash pan on stopping the engine.

8. An engine lubricating system including a source of lubricant supply, a splash pan, means including a conducting portion for circulating lubricant under pressure to engine parts to be lubricated during engine operation, a lubricant reservoir having an inlet and outlet respectively communicating with the lubricant conducting portion and said splash pan, and valve means responsive to pressure of the lubricant in said conducting portion for controlling said reservoir inlet and outlet.

9. An engine lubricating system including a source of lubricant supply, a splash pan, means including a conducting portion for circulating lubricant under pressure to engine parts to be lubricated during engine operation, a lubricant reservoir having an inlet and outlet respectively communicating with the lubricant conducting portion and said splash pan, and a two way valve responsive to pressure of the lubricant in said conducting portion for controlling said reservoir inlet and outlet.

10. In an internal combustion engine, a crankcase structure having lubricant conduits, a lubricant pump, said crankcase structure having a recess opening outwardly thereof, a cover for closing said recess and cooperating therewith to provide a lubricant reservoir, said cover having a lubricant passage cooperating with the lubricant conduits in the crankcase to provide a lubricant conducting system.

11. In an internal combustion engine, a crankcase structure having lubricant conduits, a lubricant pump, said crankcase structure having a recess opening outwardly thereof, a cover for closing said recess and cooperating therewith to provide a lubricant reservoir, said cover having a lubricant passage cooperating with the lubricant conduits in the crankcase to provide a lubricant conducting system, said lubricant passage forming an intermediate portion of the lubricant conducting system intermediate the pump and engine parts to be lubricated.

ANDRE J. MEYER.